United States Patent [19]

Blackwood et al.

[11] Patent Number: 5,049,486
[45] Date of Patent: Sep. 17, 1991

[54] TEMPERATURE MONITORING APPARATUS AND METHOD IN A COMPOSTING SYSTEM THROUGH WHICH ORGANIC MATTER IS MOVED TO EFFECT COMPOSTING

[75] Inventors: Kenneth R. Blackwood, Homewood; David B. Derryberry, Irondale, both of Ala.

[73] Assignee: Ashbrook-Simon-Hartley Corporation, Houston, Tex.

[21] Appl. No.: 337,868

[22] Filed: Apr. 14, 1989

[51] Int. Cl.⁵ .......................... C12Q 3/00; C12M 1/38
[52] U.S. Cl. ........................................ 435/3; 435/290; 435/299; 435/313; 435/813; 422/184; 210/612; 71/9; 374/141
[58] Field of Search ................... 435/3, 289, 290, 291, 435/284, 299, 313, 813, 316; 422/184; 210/612, 613; 71/9, 10; 374/137, 141, 148; 241/23; 34/30

[56] References Cited

U.S. PATENT DOCUMENTS

| | | | |
|---|---|---|---|
| 3,921,228 | 11/1975 | Sundberg | 422/184 |
| 4,384,877 | 5/1983 | Nemetz | 435/3 |
| 4,436,817 | 3/1984 | Nemetz | 435/313 |
| 4,707,148 | 11/1987 | Richmond | 374/137 |
| 4,798,802 | 1/1989 | Ryan | 422/184 |

FOREIGN PATENT DOCUMENTS 2199820  7/1988  United Kingdom ................. 71/9

Primary Examiner—David L. Lacey
Assistant Examiner—William H. Beisner
Attorney, Agent, or Firm—Foley & Lardner

[57] ABSTRACT

A temperature monitoring method and apparatus for monitoring the temperature within a mass of organic matter moved through a composting vessel. An elongated, stationary probe extends through the vessel from one end toward another end thereof. A plurality of temperature measuring devices are mounted along the probe. The probe may extend through a compaction ram and be provided with a sleeve for accommodating movement of the ram relative to the probe. A decoupling device provides for decoupling of the probe from a mounting base and an extraction device permits the probe to be extracted from the vessel for replacement thereof. The probe provides a method of monitoring temperature in the mass and a method of composting by monitoring temperature in the mass and regulating the temperature of the mass in response thereto.

18 Claims, 3 Drawing Sheets

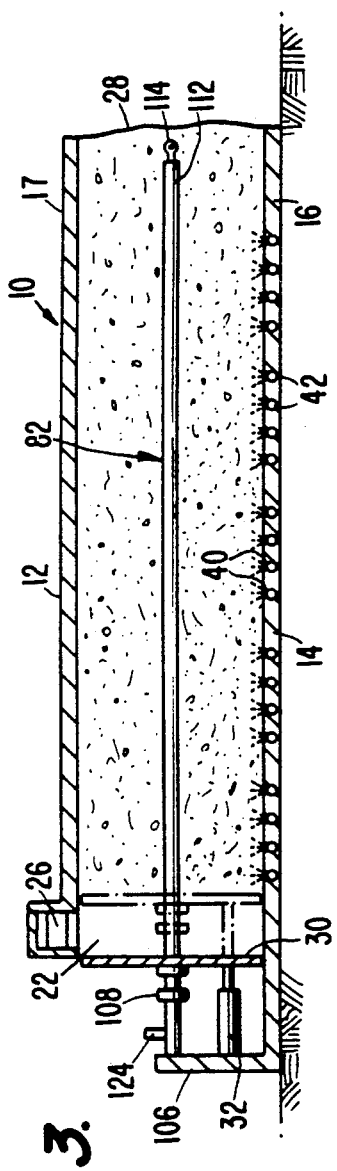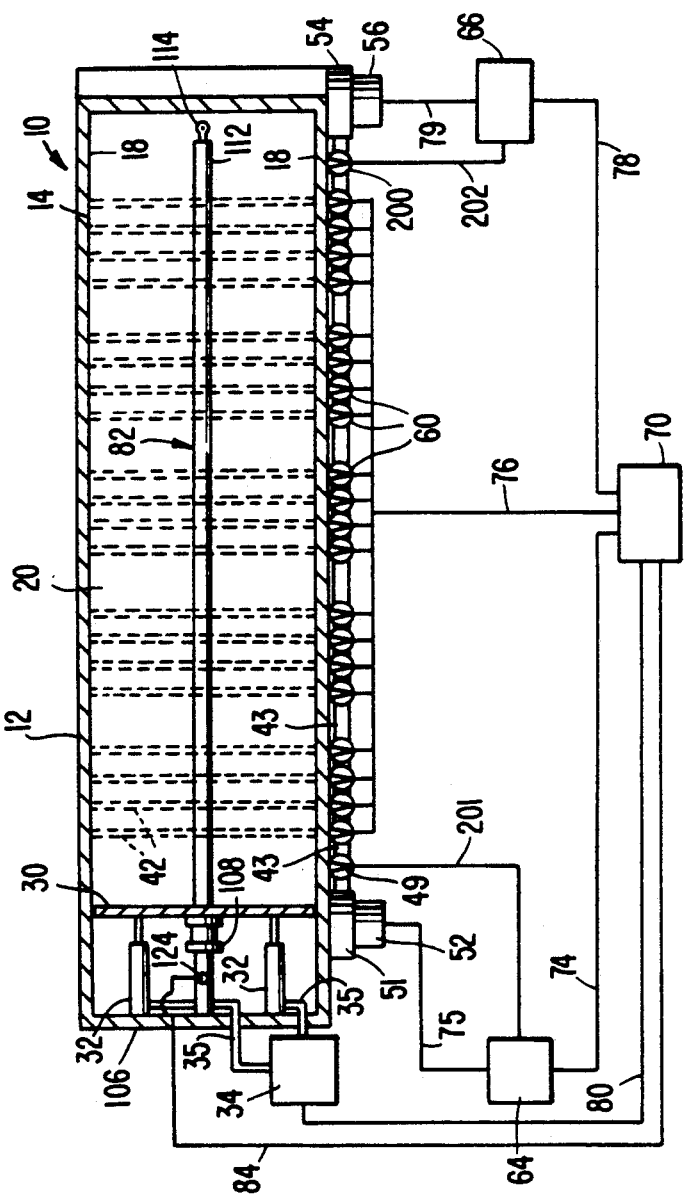
FIG. 3.
FIG. 4.

TEMPERATURE MONITORING APPARATUS AND METHOD IN A COMPOSTING SYSTEM THROUGH WHICH ORGANIC MATTER IS MOVED TO EFFECT COMPOSTING

BACKGROUND OF THE INVENTION

1. Field of the Invention

The invention relates to a method and apparatus for monitoring temperature during aerobic composting of organic waste matter.

2. Discussion of the Prior Art

It is known to compost organic waste material, such as sludge from a waste water treatment facility or garbage, utilizing mechanical composting bins or vessels and pressurized aeration channels. The goal is to produce a nonodorous organic material which can often be sold as a soil amendment and which at least is not costly and objectionable to dispose of. In the process, the amount of water in the composting material is reduced, thus resulting in drying of the organic matter to further alleviate the disposal problem.

The usual proposals for mechanical composting have involved upright, cylindrical devices in the nature of silos through which pressurized aeration air is circulated to aid in the decomposition process. As an alternative to vertical composting silos, it is known to provide a horizontal composting method and apparatus of a simple construction in which organic matter is moved horizontally along the length of the composting vessel in a stepwise fashion with the use of an actuated ram. Diffusers have been used along the length of the vessel to inject aeration air into the organic matter to aid in carrying out the composting process in a relatively short period of time by controlling the temperature.

This temperature control is a critical part of the composting process. If the temperature of the organic matter is too low, the process will take too long to complete. On the other hand, if the temperature is too high, the process breaks down. The key to economically operating whatever equipment is used in the composting process is to achieve an optimum temperature for a selected time period in order to quickly and completely process the organic matter. One example of such a temperature and time period is to achieve an optimum temperature of 55° C. for three days. In order to achieve this, the temperature of the organic matter must be controlled, and in order to control the temperature, some means of temperature monitoring is required.

In order to control the temperature of the composting mass to the desired temperature in the horizontal composters using air to accelerate the process, a monitoring device is necessary to provide the temperature at a plurality of points throughout the mass.

Temperature monitoring devices located at the perimeter of the composting chamber cannot provide appropriate temperature readings. Thus, a temperature monitoring device or method which probes into the mass of the organic matter is desired.

A problem connected with monitoring temperature at the mid-point is related to the fact that the composting mass of organic matter moves through the composter and therefore any monitoring device used must accommodate such movement.

OBJECTS OF THE INVENTION

It is therefore an object of the present invention to provide a composting method and apparatus in which the average temperature of the mass of organic matter is monitored and controlled.

It is a related object of the present invention to provide a composting method and apparatus in which such temperature monitoring and control is achieved in a mechanically simple an inexpensive manner.

It is yet another object of the present invention to provide a composting method and apparatus in which such temperature monitoring and control accommodates the moving mass of organic matter through the chamber.

It is a further object of the present invention to provide a composting method and apparatus in which the provision of aeration air circulating through the organic matter to regulate the temperature thereof is responsive to the monitored temperature of the mass.

It is yet a further object of the present invention to provide automatic control of air circulation and penetration in response to predetermined temperature changes sensed by the temperature monitoring apparatus.

These and other objects and advantages of the present invention will be more fully brought out in the description which follows with reference to the accompanying drawings.

SUMMARY OF THE INVENTION

To achieve the foregoing objects, the present invention provides a temperature monitoring apparatus for monitoring the temperature within a mass of organic matter moved through a composting vessel by means of a compacting ram. An elongated, stationary probe extends through the vessel from one end toward the other. A plurality of temperature measuring devices are mounted along the probe. The probe may extend through the ram and be provided with a sleeve for accommodating movement of the ram relative to the probe. A decoupling device provides for decoupling of the probe from a mounting base and an extraction device permits the probe to be extracted from the vessel for replacement thereof. The probe provides a method of monitoring temperature in the mass and a method of composting by monitoring temperature in the mass and regulating the temperature in response thereto.

BRIEF DESCRIPTION OF THE DRAWINGS

FIG. 3 is a side view in cross-section of an embodiment of the composting apparatus of FIG. 1 taken along the line 3—3 of FIG. 1;

FIG. 4 is a top view in cross-section of an embodiment of the composting apparatus taken along the line 4—4 of FIG. 1 and showing the control system for the composting apparatus in schematic form.

DETAILED DESCRIPTION OF THE PREFERRED EMBODIMENTS

Figure 2:
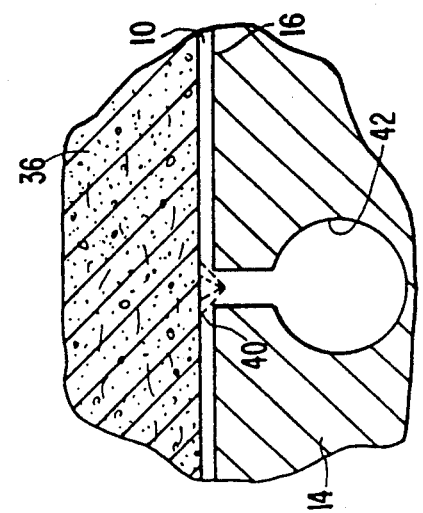
FIG. 2 is an enlarged, fragmentary, detailed sectional view showing in closeup the relationship between the charge of organic matter and the floor of the composting apparatus.

By way of background and introduction, a composting system of a type with which the method and apparatus for temperature monitoring and control may be used will first be described.

In this regard, reference numeral 10 refers generally to a composting apparatus according to the particular exemplary embodiment of the present invention as shown and described herein. Composting apparatus 10 includes a hollow vessel 12 defined by walls 14. In the particular embodiment as shown and described, the vessel has a rectangular cross-section such that walls 14 include a floor 16, a top wall 17, and side walls 18 extending in parallel fashion between the floor 16 and top wall 17. Walls 14 define a chamber 20 within vessel 12. As will be seen from the drawings, vessel 12 and its internal chamber 20 are elongated so as to take the form of a conduit. Of course, composting apparatus 10 could be a conventional horizontally oriented composter, with top-to-bottom compost flow, which is modified and improved as discussed in greater detail below.

At one end of vessel 12 is an inlet 22 having an infeed conveyor 26, whereby inlet 22 in conjunction with infeed conveyor 26 permits communication with chamber 20 within the vessel 12. At the opposite end of vessel 12 is an outlet 28.

Within chamber 20 adjacent inlet 22 is a ram 30 driven by a set of actuators 32, which preferably are hydraulic cylinders but which could also be pneumatic cylinders or screw jacks. If actuators 32 are indeed hydraulic cylinders, they are actuated by a source 34 of pressurized hydraulic fluid shown schematically in FIG. 4, which pressure source 34 communicates with actuators 32 via hydraulic fluid lines 35. Preferably, the source 34 of pressurized hydraulic fluid is a pump feeding hydraulic fluid in the form of oil to actuators 32 via hydraulic line 35 to move the ram 30.

Figure 1:
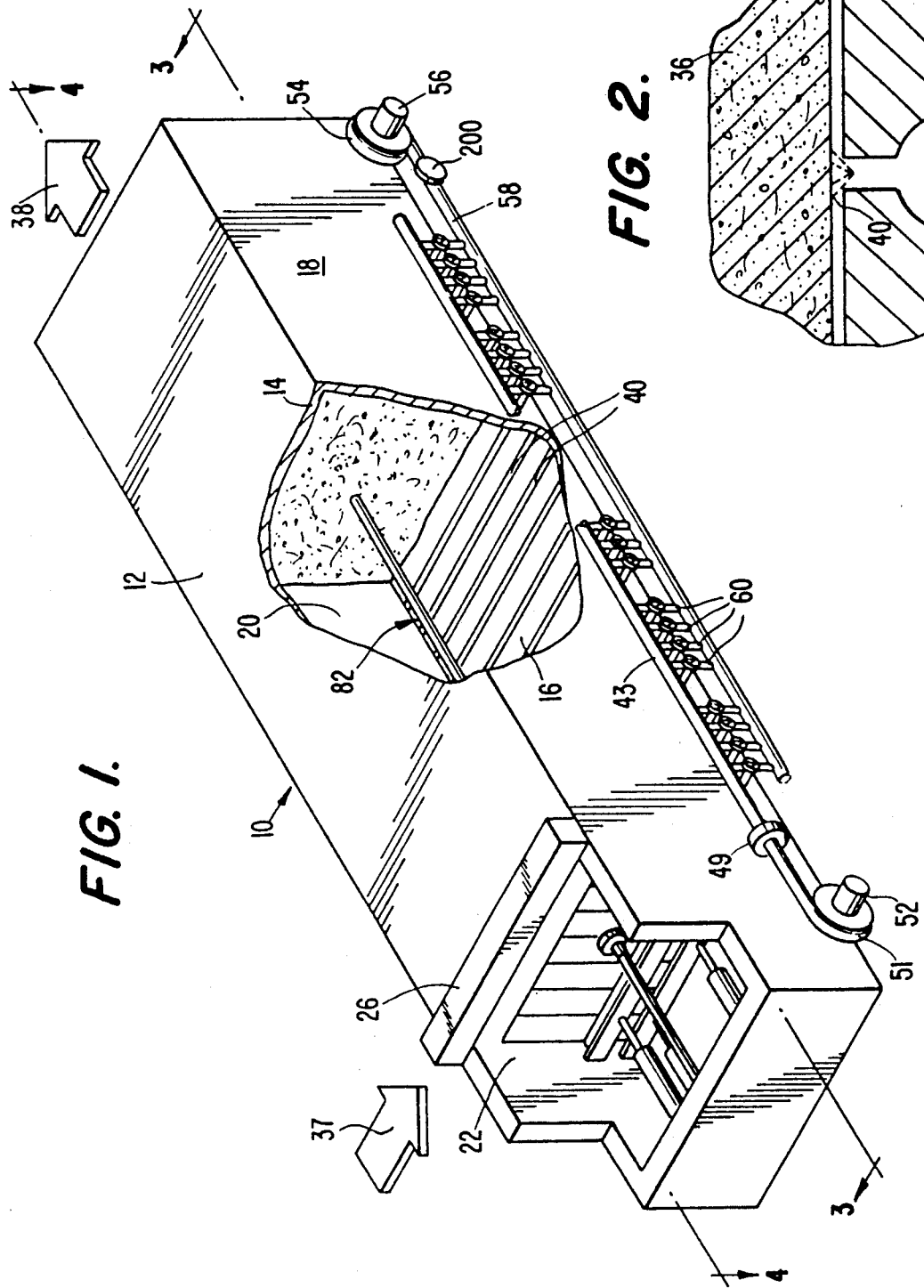
FIG. 1 is a perspective view, partially cut away, of an embodiment of a composting apparatus according to the present invention.
Figure 5:
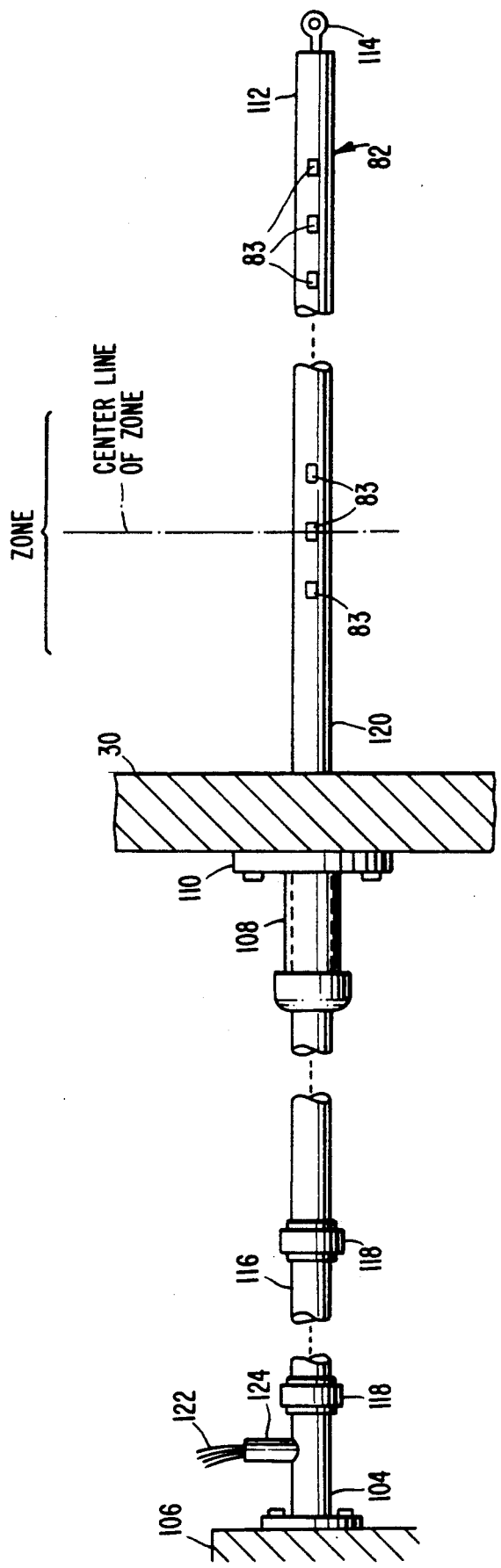
FIG. 5 is a side view of an embodiment of the temperature probe according to the present invention.

Organic matter, such as sludge from a waste water treatment system or solid waste or garbage, is fed into the composting apparatus 10 via infeed conveyor 26 in a direction shown by arrow 37 (FIG. 1.) The organic matter is fed into chamber 20 at the end thereof adjacent inlet 22 and is deposited in front of ram 30. Actuators 32 are actuated to move ram 30 in a direction toward outlet 28 in order to advance the charge of organic matter 36 through composting apparatus 10. The advancing stroke of ram 30 is shown in phantom lines in FIG. 3.

The distance between the retracted position of ram 30 as shown in solid lines in FIG. 3 and the fully advanced position as shown in phantom lines in FIG. 3 represents the volume of one charge of organic matter 36 fed into the composting apparatus 10 during one infeed operation. After such an infeed operation, ram 30 remains in this fully advanced position until it is retracted to the solid line position shown in FIG. 3 when the next infeed operation is initiated.

As new charges of material are advanced through the vessel 12 via the infeed operation in advance of the ram 30, earlier charges of organic matter 36 which have advanced entirely through vessel 12 and with respect to which the composting operation has been completed are discharged from vessel 12 via outlet 28. The direction of discharge is illustrated by arrow 38 in FIG. 1.

A temperature probe 82 is preferably formed of stainless steel and comprises a plurality of sections appropriately connected together to provide a desired length. It is contemplated that a first end 104 of probe 82 may be attached to a reaction wall 106 adjacent inlet 22 and extend through ram 30 by means of a sleeve member 108 concentrically disposed on probe 82. Sleeve member 108 is attached to ram 30 via a collar 110. Probe 82 extends in the direction of movement of the organic matter and terminates at a second end 112 adjacent outlet end 28 of apparatus 10. Second end 112 includes an eyebolt 114. In this manner, probe 82 extends through the organic matter 36 and ram 30 is permitted to move relative to probe 82 by virtue of sleeve member 108. Thus, probe 82 is supported at first end 104 by reaction wall 106 and sleeve member 108, and at second end 112 by the mass of organic matter 36.

It is also contemplated, as an alternative embodiment, that at least one of such probes 82 may extend from the outlet end 28 of the vessel 12 toward the inlet end 22 and terminate just short of the advanced position of ram 30 so as not to interfere with the advancing stroke of ram 30.

Movement of the organic matter 36 during compaction by ram 30 produces stabilizing forces on probe 82 which keep probe 82 in the same relative position in the organic matter 36. The sliding motion of the mass along probe 36 cleans the probe surface.

Should replacement of the probe be required, a coupling 116 defined by a pair of spaced apart collars 118, located between ram 30 and reaction wall 106, is disconnected and a cable may be attached to the longer piece of the probe at 118. A second cable may be attached to eyebolt 114 and may be used to pull the probe from the organic matter in the direction of outlet 28. The first cable is pulled into the resulting hole in the compacted organic matter 36 formed by the probe 82. Once the old probe has been removed, the first cable may be attached to a new probe and the new probe pulled toward the inlet 22 into the probe hole in the organic matter 36. The first cable is removed and the new probe is attached at the coupling 116.

The surface 120 of probe 82 is provided with a plurality of temperature measure devices (TMD's) 83 in such a manner that a group of preferably three TMD's 83 are provided in each zone (to be described later) in a manner such that one TMD is centrally positioned in each zone and adjacent TMD's are equally spaced on opposite sides of the centrally positioned TMD. Examples of TMD's include thermocouples and resistance temperature devices. The three TMD's in each zone are preferably wired in parallel to provide an average readout for each zone. By using three TMD's per zone, the probe 82 will still provide a signal representing the temperature of a zone in the event of failure of one or two of the TMD's in that zone. Wires 122 from the TMD's 83 extend through probe 82 and exit at conduit 124 adjacent first end 104.

If desired, a plurality of probes 82 may be used in one composter, the key being that all such probes 82 extend along the composter in the direction of movement of the organic matter 36, i.e., the axis of each probe 82 is parallel with the direction of movement of the mass of organic matter 36.

Probe 82 of the type described above may be used in connection with a vessel 12 including in the floor 16, a set of floor-mounted diffusers or orifices 40 distributed along virtually the entire length of vessel 12 for providing aeration air thereto. These diffusers 40 communicate with chamber 20 of vessel 12 to permit pressurized air to be injected into chamber 20. The air injection is accomplished via air passages 42 in floor 16, which air passages are fed by an air header 43 disposed in outlet vessel 12. Thus, air header 43 communicates with series of air passages 42 which, in turn, communicate with diffusers 40 for injecting air into chamber 20.

In the particular exemplary embodiment shown, there is a source of aeration air. This source provides air for effecting aeration and temperature control of the organic matter 36 to convert it to compost in a known manner. The aeration air is generated by a blower 51 driven by electric motor 52. Aeration air is fed into air header 43 to then pass through air passages 42 in floor 16 of chamber 20 and thence through diffusers 40 for aeration of the organic matter 36 to aid in composting.

A selected portion of the set of diffusers or orifices 40 may act as suction orifices or inlets for return of aeration air which has been introduced into the organic matter 36 by others of the diffusers or orifices 40. By providing that some of the orifices 40 act as air returns, circulation through the organic matter 36 may be improved and the temperature better regulated.

This aeration air return is accomplished via a suction fan 54 driven by a motor 56. Suction fan 54 pulls air through valve 200 and communicates with the suction header 58 which, in turn, selectively communicates with a certain portion of the air passages 42. When certain of the air passages 42 are in communication with suction header 58, air passages 42 then act as air returns for drawing aeration air from organic matter 36 to enhance circulation of aeration air.

Selection of which of orifices 40 will act as diffusers for introducing aeration air into chamber 20 and which of orifices 40, and associated air passages 42, will act as air returns is determined by a series of valves 60, preferably in the form of electronically controlled valves such as solenoid valves. Preferably, too, such a valve 60 will be disposed between each air passage 42 and the air header 43 and suction header 58. Separate zones (previously mentioned) of pressure and suction diffusers may be provided. In the particular exemplary embodiment shown and described, there are five zones of four air passages per zone. Each zone may correspond generally with a charge of material fed into vessel 12 by one infeed operation and one stroke of ram 30. Alternatively, a zone may hold more or less than one charge of material. For example, certain conventional composters have approximately three charges located in a particular zone at a given time. Regardless of the amount of material therein, one such zone may be put under pressure, the next under suction, and so on in an alternating fashion.

The aeration air system includes an aeration control 64 coupled with the valve 49 and/or the blower 51 which produces aeration air, and more specifically with the motor 52 of that blower. Aeration control 64 is preferably electronic and sends electrical signals to valve 49 and/or motor 52 of blower 51 to regulate the intensity of aeration air produced by blower 51.

Just as the sources of aeration air have controls, so too the source of suction air, i.e., the valve 200 and/or the suction fan 54 driven by motor 56, has a suction air control 66 for energizing motor 56 of suction fan 54 and for regulating its/their operation. Preferably, too, suction air control 66 is electronic.

It is preferred that both of the controls 64 and 66 be coupled with a master controller 70 shown schematically in FIG. 4. Master controller 70 acts as a central station from which aeration air and suction air may be controlled.

Master controller 70 is connected to the aeration system via line 74 running to aeration control 64. In turn, aeration-producing control 64 is coupled to motor 52 of blower 51 via line 75 and/or connected to valve 49 via line 201. The master controller 70 is preferably also coupled with valves 60 which determines the pattern of which air passages 42 and orifices 40 are under pressure and which, if any, are under suction. In this regard, master controller 70 provides the appropriate signals to valves 60 over a line 76 (FIG. 4). Master controller 70 controls the suction air by sending signals to suction control 66 over line 78. In turn, suction control 66 is coupled with motor 56 of suction fan 54 by line 79 and/or with valve 200 by line 202. Master control 70 also controls the operation of the ram 30 which is driven by hydraulic cylinders 32. Further, master controller 70 requires input from temperature probe 82.

The pattern of aeration utilizing pressure or pressure and suction for air passages 42 and their orifices 40 will be determined in part by the temperature of the mass of organic matter 36 as measured by temperature probe 82. Thus, temperature probe 82 preferably extends axially along the geometric center of chamber 20 between inlet 22 and outlet 28 to measure the temperature of the organic matter 36 in the various zones of the composting apparatus 10. Signals from the temperature measuring devices 83 in each zone along the length of the probe 82 are preferably fed from wires 122 back over line 84 to master controller 70 to actuate the aeration air in a pattern (e.g., all pressure or a combination of pressure and/or suction) and at an intensity which will produce an optimum temperature in the organic mass as determined by experience and/or by an algorithm or program utilized by master controller 70. Of course, the ability to accomplish this is generally enhanced by temperature probe 82 which provides an accurate measurement of temperature deep within the mass of organic matter without interfering with the flow of organic matter through the composting apparatus.

A suitable temperature control such as a PID (proportional integral derivative) type controller can be incorporated into master controller 70 to receive temperature information via the temperature measuring devices 83 in a given zone or zones of probe 82 and, in response to an undesirable temperature of the organic matter 36 in that zone or zones, controller 70 may automatically actuate one or more of the blower 51, valve 49, suction fan 54 and valve 200 in combination with actuating appropriate valves 60 to cause orifices 40 to act as suction orifices or inlets thereby improving the circulation of aeration air through the organic matter 36 in order to maintain a desired temperature at the appropriate zone or zones penetrated by probe 82.

Although the invention has been described with reference to a specific exemplary embodiment, it is to be understood that many modifications, variations and equivalents are possible within the scope of the appended claims.

What is claimed is:

1. A method of composting by monitoring the temperature of a mass of organic matter moved through a composting vessel and regulating the temperature in response thereto, including the steps of:
   surrounding at least one elongated probe with a mass of organic matter to be composted;
   moving the mass of organic matter through the composting vessel in the same direction as that in which the elongated probe extends;
   measuring the temperature of the interior of the mass of organic matter at a plurality of locations along the probe; and regulating the temperature in the vessel by temperature regulating means coupled with said probe.

2. The method of claim 1, wherein the organic matter is moved by a ram.

3. The method of claim 2, including the additional step of:
mounting a bearing on the probe for accommodating movement of the ram relative to the stationary probe.

4. A method of monitoring temperature in a mass of organic matter moved through a composting vessel, including the steps of;
surrounding at least one elongated probe with a mass of organic matter to be composted;
moving the mass of organic matter through the composting vessel in the same direction as that in which the elongated probe extends; and
measuring the temperature of the interior of the mass of organic matter at a plurality of locations along the probe.

5. A composting apparatus for accelerated aerobic decomposition of organic matter, the apparatus comprising:
a composting vessel through which the organic matter is moved to effect composting;
at least one elongated probe extending from a first end of said vessel toward a second end of said vessel such that, when said vessel is filled with organic matter, said probe is supported by the moving organic matter;
means for aerating the organic matter as it moves through said composting vessel; and
a plurality of temperature measuring devices mounted along the probe.

6. The apparatus of claim 5, wherein the probe is stationary.

7. The apparatus of claim 5, including:
means for extracting the probe from the vessel for replacement thereof.

8. A composting apparatus for accelerated aerobic decomposition of organic matter, the apparatus comprising:
a composting vessel;
a ram for moving the organic matter from a first end of said vessel toward a second end thereof;
at least one elongated probe extending from said first end of said vessel toward said second end of said vessel such that, when said vessel is filled with organic matter, said probe is supported by the moving organic matter;
means for aerating the organic matter as it moves through said composting vessel;
a plurality of temperature measuring devices mounted along the probe; and
means mounted on the ram for accommodating movement of the ram relative to the probe.

9. The apparatus of claim 8, wherein the plurality of temperature measuring devices are spaced apart in groups.

10. The apparatus of claim 8, wherein the probe includes a decoupling device adjacent the first end of the vessel and an extraction device adjacent the second end of the vessel.

11. The apparatus of claim 8, wherein said means mounted on the ram comprises a sleeve having a flange for connection to the ram.

12. The apparatus of claim 8, wherein the probe is stationary.

13. A composting apparatus for accelerated aerobic decomposition of organic matter, the apparatus comprising:
a vessel having a chamber defined therein;
an inlet to said chamber of said vessel and an outlet from said chamber of said vessel, said chamber having a lengthwise axis;
a ram connected with said vessel, said ram being movable with respect to said vessel for compacting and moving organic matter deposited in said chamber from said inlet toward said outlet in the direction of the lengthwise axis;
a temperature probe mounted in said vessel and extending through said chamber in a direction substantially parallel to said lengthwise axis such that, when said vessel is filled with organic matter, said probe is supported by the moving organic matter
a plurality of temperature measuring devices mounted along said probe;
means for aerating the organic matter as it moves through the composting vessel; and
means for regulating the temperature in said chamber, said temperature regulating means being coupled with said probe.

14. The apparatus of claim 13, wherein said chamber is elongated and has a rectangular cross-section.

15. The apparatus of claim 14, wherein said probe extends through the geometric center of said cross-section and coaxially with respect to said lengthwise axis.

16. The apparatus of claim 13, including:
a sleeve slidably mounted on said probe, said sleeve being mounted in said ram to permit said ram to move relative to said probe.

17. The apparatus of claim 16, wherein a first end of said probe is mounted in a wall adjacent said ram, said probe extending through said ram via said sleeve.

18. The apparatus of claim 12, including:
an eyebolt connected to a second end of said probe opposite said first end.

* * * * *